United States Patent [19]

Cole

[11] Patent Number: 4,891,823
[45] Date of Patent: Jan. 2, 1990

[54] CHANNEL ENCODER FOR GENERATING ROTATIONALLY INVARIANT TRELLIS CODES

[75] Inventor: Paul D. Cole, Fairfield, Conn.
[73] Assignee: General DataComm Inc., Middlebury, Conn.
[21] Appl. No.: 262,714
[22] Filed: Oct. 26, 1988
[51] Int. Cl.[4] .................................................. H04B 14/04
[52] U.S. Cl. ............................................ 375/25; 371/43; 341/81
[58] Field of Search ................ 375/25, 34, 37, 39, 375/42; 371/43, 44, 45; 341/81, 95, 106

[56] References Cited

U.S. PATENT DOCUMENTS

| | | | |
|---|---|---|---|
| 4,338,284 | 8/1985 | Lang et al. | 375/42 |
| 4,631,735 | 12/1986 | Qureshi et al. | 375/34 |
| 4,677,625 | 6/1987 | Betts et al. | 375/39 |
| 4,755,998 | 7/1988 | Gallager | 371/43 |
| 4,756,007 | 7/1988 | Qureshi et al. | 375/37 |

Primary Examiner—Robert L. Griffin
Assistant Examiner—Stephen Chin
Attorney, Agent, or Firm—David P. Gordon

[57] ABSTRACT

An encoder is provided for generating rotationally invariant trellis codes when used with a signal constellation having m subconstellations indexed by j, each subconstellation having a plurality of points, where each subconstellation is a distinct rotation by $j(360/m)$ degrees of another subconstellation such that no subconstellation has a point in common with another subconstellation. The encoder has a state block and a state update block. The state means receives q inputs i, and generates m outputs j, where $m=pq$ and where p and q are integers greater than one and have no common factors. Outputs m are generated according to inputs i and states s of the state block according to $j=i \bmod q$ and $jd=s \bmod p$, where the state block can assume n states, and $n=md$ where d is an integer greater than one and has no common factors with p. The state update block updates the state block to a new state t chosen from the allowable n states based on the output j and previous state s according to $t=jd+F(s-jd) \bmod n$, where F is the permutation of $0, \ldots, n-1$, and is a function given by $F(am+b)=bd+a$ for $a=0, \ldots, d-1$, and for $b=0, \ldots, m-1$.

4 Claims, 3 Drawing Sheets

CHANNEL ENCODER FOR GENERATING ROTATIONALLY INVARIANT TRELLIS CODES

BACKGROUND

This invention relates generally to channel encoders which generate error correcting codes for data communications over impaired channels. More particularly, the present invention concerns channel encoders which generate rotationally invariant trellis codes when used with a signal constellation comprised of a plurality of subconstellations which are rotations of each other.

The use of channel encoders which supply redundancy to information which is to be transmitted over impaired channels and thereby guarantee accuracy within desired degrees of certainty are known in the art (see, e.g. U.S. Pat. No. 4,562,425 to Turner et al., and Forney Jr., G. David et al., "Efficient Modulation for Band-Limited Channels", *IEEE Journal on Selected Areas in Communications,* Vol. SAC-2, No. 5 (September 1984 pgs 632–646). A particular class of such encoders are known as "Trellis" encoders. Broadly speaking, trellis encoders take an input which is chosen from a specified alphabet of inputs symbols, and based on the input and the state of the encoder (which is based on the previous history of inputs and states) provides an ouput chosen from an alphabet of output symbols. The distinguishing property of a trellis encoder is that each output symbol indicates in a predetermined way a real vector taken from a specified set of real vectors; the specified set constituting a signal constellation. In transmitting a signal constellation via quadrature amplitude modulation, the signal constellation must comprise a subset of either the Euclidean plane, or a Cartesian product of a fixed number of Euclidean planes. In other words, the signal constellation may be expressed as a union of two-dimensional or 2n-dimensional points. The points in the Euclidean plane then represent quadrature amplitude modulated signals with each point having a particular power associated with it (the squared Euclidean distance to the origin) due to its location in the plane.

Trellis coding supplies relative immunity to noise and other impairments of a transmitting channel by providing a relatively large separation (i.e. Euclidean distance) between the sequences of constellation points generated by the encoder (i.e. encoder outputs). Inherently, this separation takes the form of power differences, the efficacy of which is measured vis-a-vis the average power of the constellation. As a result, it is beneficial for trellis encoders to use constellations in which the ratio of average power divided by the squared Euclidean distance between closest constellation points is relatively low. Such constellations typically possess much circular symmetry.

While circularly symmetric constellations have certain beneficial aspects as described above, those skilled in the art will recognize that if an R-degree rotation about an origin takes a constellation to itself (i.e. circular symmetry), then the combination of channel corruption followed by channel equalization can result in R-degree phase offset, wherein each term in the received sequence is a corrupted version of the R-degree rotation of a corresponding term in the transmitted sequence. One manner of dealing with phase offset is to provide a rotationally invariant encoding scheme (See, e.g. Wei, Lee-Fang, *Rotationally Invariant Convolutional Channel Coding with Expanded Signal Space—Part II; Nonlinear Codes,* "IEEE Journal on Selected Areas in Communications, Vol SAC-2, No. 5" September 1984 pgs 672–686). In such a scheme, for each rotation taking the constellation to itself, there must be a corresponding transformation of the encoder's set of states and a corresponding transformation of the input alphabet. With rotational invariance, compensation for the phase offset may then be accomplished by precoding the input stream using the technique known as differential encoding.

Trellis codes employing "set-partitioned" constellations are also well known in the art (See, e.g. Ungerboeck, Gottfried, "Channel Coding with Multilevel/Phase Signals", *IEEE Transactions on Information Theory,* Vol IT-28 No. 1, (January 1982). For such codes, the constellation is divided into non-overlapping, equal-sized subsets, which herein are termed "subconstellations". The essential feature of subconstellations is that the separation between the closest two points within each subconstellation exceeds the separation between the closest two points within the constellation as a whole. With the use of subconstellations, an encoder ouput symbol is preferably generated in two steps. First, a subconstellation is selected. Next, a point in the subconstellation is identified. As such, encoder output symbols may thought of as a pair of labels, with a first term being a subconstellation label, and a second term being a point label.

Depending upon the speed of data transmission, and the amount of redundancy required due to encoding, constellations of different sizes (i.e. amount of points) are required. In choosing the constellation points, it is known that it is beneficial to divide the points into groups of subconstellations which are rotations of other subconstellations. Moreover, it is desirable to provide a constellation which has as much circular symmetry as possible, as the average power of the constellation may be reduced thereby. Thus, many of the constellations of the art, which are based on a square grid, are often seen to have points chosen to provide as circular an arrangement as possible. Other known constellations are based on an hexagonal grid (See, e.g. U.S. Pat. No. 4,538,284 to Lang et al.,) as the hexagonal grid permits a dense and nearly circular constellation.

SUMMARY OF THE INVENTION

It is therefore an object of the invention to provide a channel encoder which generates rotationally invariant Trellis codes.

It is a further object of the invention to provide a channel encoder which generates rotationally invariant Trellis codes for a hexagonal constellation.

In accord with the objects of the invention, an encoder is provided and comprises:

state means for receiving inputs i, where $i=0, \ldots, q-1$, and where q is an integer greater than one, and for generating outputs j, where $j=0, \ldots, m-1$ and $m=pq$ where p is an integer greater than one and has no common factors with q, said outputs generated according to said inputs i and states s of said state means according to $j=i \bmod q$ and $jd = s \bmod p$, where $s=0, \ldots, n-1$ and $n=md$ where d is an integer greater than one and has no common factors with p; and state update means for updating said state means to a new state t chosen from said $0, \ldots, n-1$ based on said output j and previous state s according to $t = jd + F(s - jd) \bmod n$, where F is the permutation of $0, \ldots, n-1$ and is a function given by $F(am+b) = bd+a$ for a=0, ..., d−1, and for b=0, ..., m−1. The provided encoder generates rotationally invariant trellis codes when used with a signal constellation having m subconstellations indexed by j, each subconstellation having a plurality of points, where each subconstellation is a distinct rotation by 360/m degrees of another subconstellation such that no subconstellation has a point in common with another subconstellation.

Additional objects and advantages of the invention will become evident to those skilled in the art upon reference to the following detailed description in conjunction with the provided figures.

DETAILED DESCRIPTION OF THE PREFERRED EMBODIMENT

A rigorous mathematical analysis of the preferred encoder of the invention may be seen with reference to Appendix I attached hereto.

Figure 1:
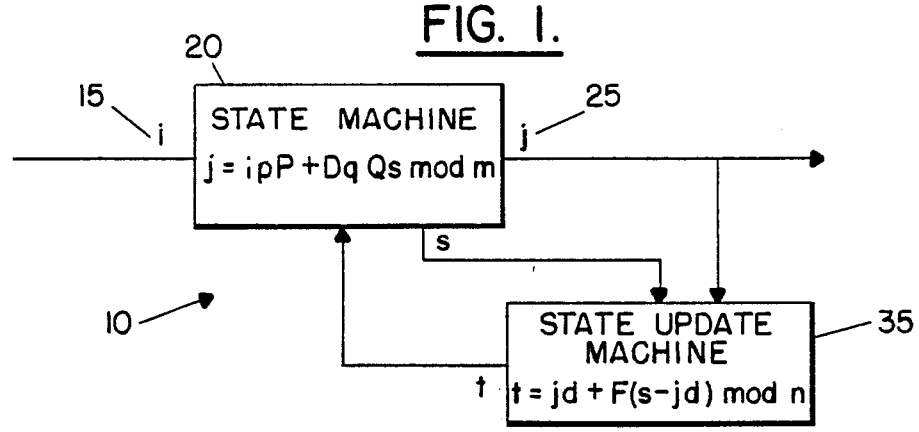
FIG. 1 is a schematic block diagram indicative of encoder functions.

Turning to FIG. 1, the general aspects of the preferred encoder 10 for generating rotationally invariant trellis codes is seen. Encoder 10, which may find general use in modems, typically receives coded data 15, such as source data which has been remapped (e.g. such as by compression). The data inputs (denoted by i) may have any of q values, where q is an integer greater than one; i.e. i=0, ..., q−1 where q is an integer greater than one.

The data inputs are fed to a state machine 20 which is arranged to generate an output j of encoded data 25 based, as will be seen hereinafter, on the input i itself, and the state s of the state machine. The ouputs j of state machine 20 may assume any of m values, where m=pq, p is an integer greater than one, and p and q have no common factor, while the state machine may assume any of n states, where n=md, d is an integer greater than one, and p and d have no common factor.

The output j generated by the state machine, as indicated in FIG. 1, is the only integer value among the m values satisfying both equations:

$$j = i \bmod q \quad (1)$$

$$jd = s \bmod p \quad (2)$$

In finding the output j based on the input and state, any of numerous equations may be utilized, such as $$j = ipP + DqQs \bmod m \quad (3)$$

where D, Q, and P are defined as integers such that dD=1 mod p, qQ=1 mod p, and pP=1 mod q. It will be recognized that the output j may be so found, as equation (3) implies equations (1) and (2). In particular: ipP+DqQs mod m=i (1 mod q)+(DQs)q mod q=i mod q, as the second term is equal to zero mod q. Likewise, jd=ipPD+DdqQs mod p=(iPD)p mod p+(1)(1)s mod p=s mod p, as the first term is equal to zero mod p.

The output j of state machine 20 is used together with the old state s of state machine 20 in a state update means 35 to compute the new state t (chosen from the n possible states) of state machine 20. The new state is computed according to:

$$t = jd + F(s−jd) \bmod n \quad (4)$$

where F() is the permutation of 0, ..., n−1 given by the formula $$F(am+b) = bd+a \quad (5)$$

for a=0, ..., d−1, and for b=0, ..., m−1.

Those skilled in the art will appreciate there are several consequences of the provided encoder design. First, for each state s of the state machine 20, there are q outputs from s. These outputs are the integers j among 0, ..., m−1 which satisfy jd=s mod p. It will be seen that j labels a particular subconstellation, such that the output of the encoder chooses a subconstellation. Second, the q different outputs of the state machine 20 take the machine from a current state into q different new states. Conversely, there are q ways to get to new state t from the m possible old states. The q ways satisfy j=(t/d) mod p, where t/d is a quotient rounded down to the nearest integer. Third, if there is an output j which causes state s to be updated to another state t, then, for any integer r, the output (j+r) mod m causes state (s+rd) mod n to be updated to new state (t+rd) mod n.

The encoder of FIG. 1 generates rotationally invariant trellis codes if used with a signal constellation which is designed having m subconstellations indexed by j, each subconstellation having a plurality of points, where each subconstellation is a distinct rotation by 360/m degrees of another subconstellation such that no subconstellation has a point in common with another subconstellation. In particular, starting with a set X(0) of points in a plane, for j=1, ..., m−1, X(j) is defined to be the set X(0) rotated by j(360/m) degrees. The signal constellaion X is then the union of the sets (subconstellations) X(0), X(1), ..., X(m−1). Constellation X is arranged such that sets X(j) and X(k) have no point in common if j does not equal k.

Figure 2:
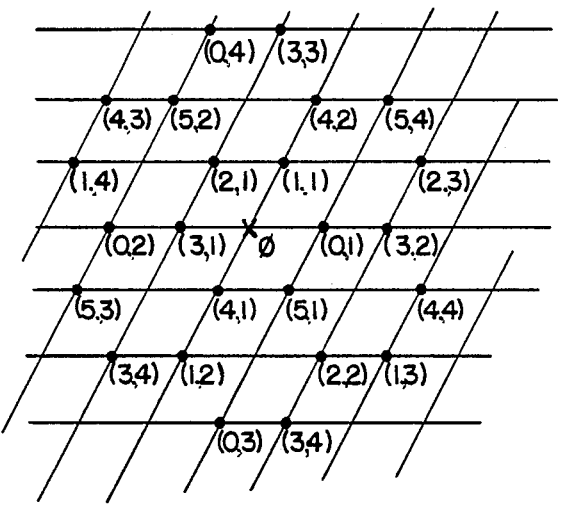
FIG. 2 is a hexagonal grid showing a constellation which, when utilized, the encoder of the invention generates a rotationally invariant trellis code.
Figure 3A:
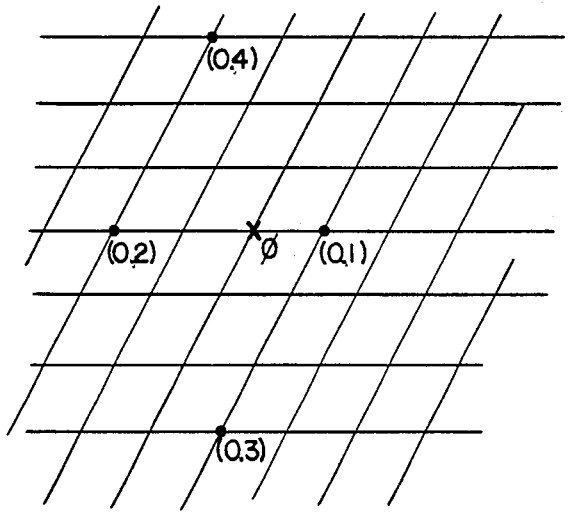
FIGS. 3a through 3f are subconstellations of the constellation of FIG. 2, each subconstellation being a rotation of another subconstellation.
Figure 3B:
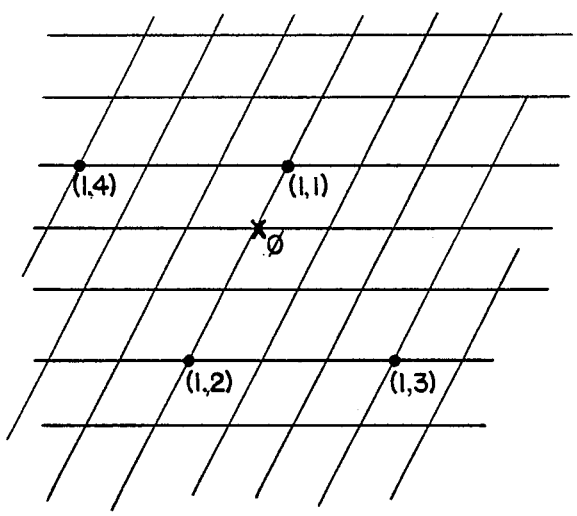
Figure 3C:
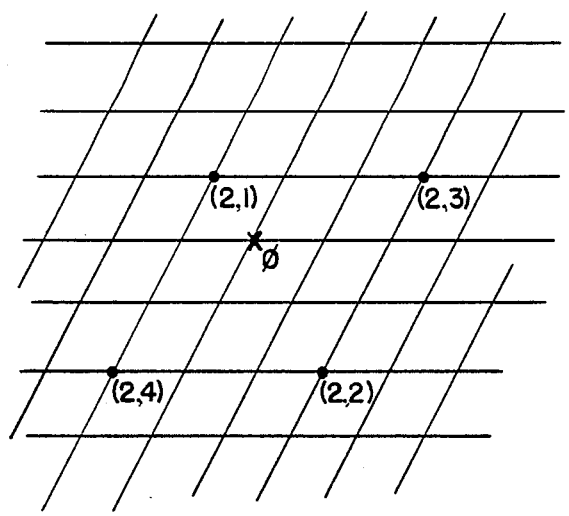
Figure 3D:
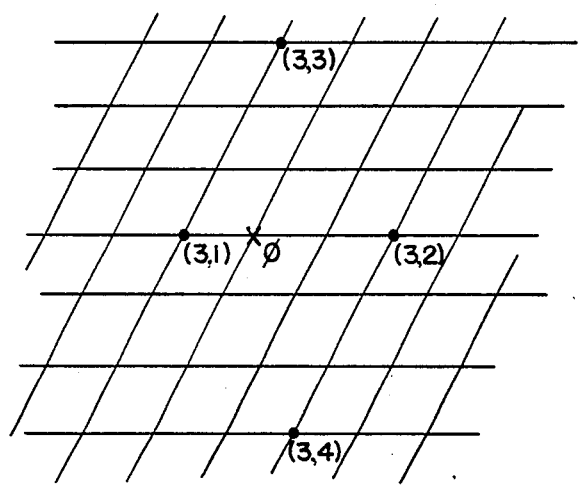
Figure 3E:
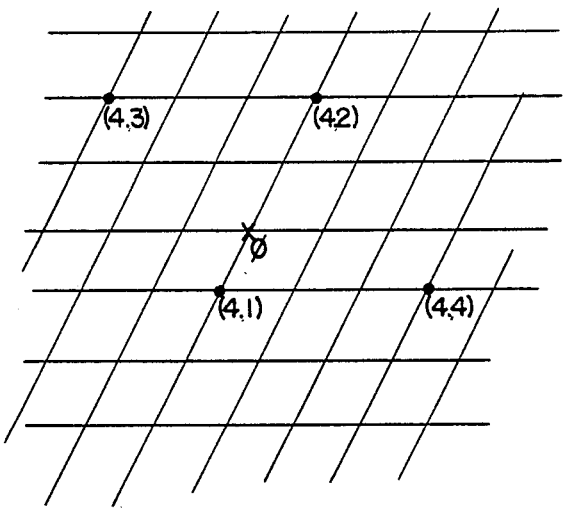
Figure 3F:
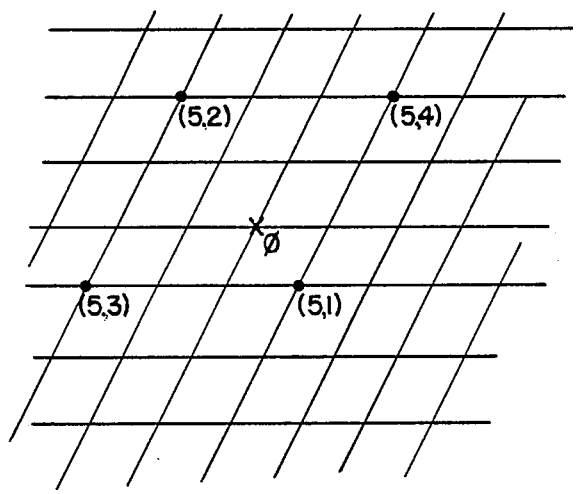

As indicated in FIG. 2, which is a hexagonal constellation of twenty-four points generated according to the above-stated requirements, the four points in subconstellation X(0) are labeled as (0,1), ..., (0,4). Broadly, the points in subconstellation X(j) for j=1, ..., m−1 are labeled as (j,1), ..., (j,x), such that the point whose label is (j,h) is the j(360/m) degree rotation of the point whose label is (0,h). The six subconstellations (j=0, ..., 5) of the constellation of FIG. 2 are seen in FIGS. 3a-3f, with the following points being included in the subconstellations:

| | | | | |
|---|---|---|---|---|
| X(0) : | 1, | −2, | 1 − 3u, | −2 + 3u |
| X(1) : | u, | −2u, | 3 − 2u, | −3 + u |
| X(2) : | −1 + u, | 2 − 2u, | 2 + u, | −1 − 2u |
| X(3) : | −1, | 2, | −1 + 3u, | 2 − 3u |
| X(4) : | −u, | 2u, | −3 + 2u, | 3 − u |
| X(5) : | 1 − u, | −2 + 2u, | −2 − u, | 1 + 2u | where $u = e^{2\pi \sqrt{-1/6}}$

With six subconstellations (m=6), a preferred state machine has two inputs (q=2, and p=3). With two inputs and six outputs, a minimum of twelve states (m=6, and d=2; md=12) are required for state machine 20. Preferably, however, the preferred state machine has either twenty-four or forty-eight states, as d is chosen to equal four or eight. The relationships between the inputs, states, and ouputs are seen in Appendices II and III hereto for d equals four and eight respectively.

It will be appreciated that the encoder of the invention, which basically comprises a state machine and a state update means may be completely implemented in software, firmware, or hardware as desired. Typically, look-up tables stored in ROM are utilized to provide an encoder ouptut from a given input and the current "state". The state update means also comprises a look-up table stored in ROM which provides a new current state based on the encoder output and the previous current state.

There has been described and illustrated herein a channel encoder for generating rotationally invariant trellis codes for particularly designed constellations. While a particular embodiment of the invention has been described, it is not intended that the invention be limited thereby, as it is intended that the invention be broad in scope and that the specifications be read likewise. Thus, while a constellation having six subconstellations was described and shown, it will be appreciated that different numbers of subconstellations may be utilized, particularly based on the number of inputs q to the encoder, provided that the chosen value of p and the value q do not have a common factor. Similarly, while a particular formula was provided for obtaining the output generated by the state machine, it will be appreciated that other formulas could be utilized provided that the formulas satisfy the two requirements j=i mod q, and jd=s mod p. Further, while particular state machines having twenty-four or forty-eight states were described, different numbers of encoder states may be utilized for a constellation divided into a predetermined number of subconstellations, simply by changing the value for d. Therefore, it will be apparent to those skilled in the art that other changes and modifications may be made to the invention as described in the specification without departing from the spirit and scope of the invention as so claimed.

APPENDIX I

1. Introduction.

The terminolgy used here for a digraph (directed graph) is taken from [4].

Z stands for the ring of (rational) integers.

For positive integers m,d, and n=md, we define the permutation $\theta(m, d)$ of Z/nZ, to be $\theta(m,d)(sm+t)=td+s$, for $s=0, \ldots, d-1$, and $t=0, \ldots, m-1$.

We denote as $\Omega(m,d)$ the digraph whose set of vertices is Z/nZ, and whose set of arcs is determined by this rule:

(w,x) is an arc in $\Omega(m,d)$ iff $\theta(m,d)(w-g)=x-g$, for some g in dZ/nZ.

For an integer h, and for a positive integer p dividing m, with $1=\gcd(p,d)$, we construct digraphs $\Omega(h,m,d)$ and $\Omega p(m,d)$ by removing arcs (but not vertices) from $\Omega(m,d)$, as follows:

(w,x) is an arc in $\Omega(h,m,d)$ iff $\theta(m,d)(w-g)=x-g$, for some g in hdZ/nZ.

(w,x) is an arc in $\Omega_p(m,d)$ iff $\theta(m,d)(w-g)=x-g$, for some g in dZ/nZ, with $g \equiv w \bmod p$.

Theorems 1 and 2, stated below, provide examples of *strongly connected* $\Omega(h,m,d)$ and $\Omega_p(m,d)$.

Theorem 1. i) Assume that e and h are integers such that: eh divides m; e divides d−1; and, $1=\gcd(e-1, d)$. Then $\Omega(h,m,d)$ is strongly connected. ii) Let $m_o$ and $d_o$ be positive integers with $n=m_o d_o$, and with $d_o \equiv d^a \bmod n-1$, for some integer a. Let h and $h_o$ be integers such that hd divides $h_o d_o$. Then $\Omega(h,m,d)$ is strongly connected if $\Omega(h_o, m_o, d_o)$ is strongly connected.

Theorem 2. If d divides $c=x_o(m-1)+pu_o(1-d)$, and if $1=\gcd(m,c/d)$, for some $x_o=0, \ldots, d-1$ and some $u_o=0, \ldots, (m/p)-1$, then $\Omega_p(m,d)$ is strongly connected.

Theorem 1 is proved in Section 3, and Theorem 2 is proved in Section 6.

New and better trellis codes have been found recently by Calderbank and Sloane [3], and by Wei [8]. Wei's codes are designed to be *rotationally invariant*, thereby assuring their transparence to phase ambiguity (see Section 9). While it is extremely useful for a trellis code's state transition diagram (ie., its *trellis diagram*) to be that of a linear convolutional code, this requirement generally is incompatible with rotational invariance. The arc-coloring of $\Omega(m,d)$ introduced in Section 4 provides means for generating a "rotationally invariant trellis diagram", from either the digraph $\Omega(m,d)$, or the digraph $\Omega_p(m,d)$ (or $\Omega(h,m,d)$, which is not pursued here). This is described in Section 8. In Section 9, a trellis code based on $\Omega_3(6,d)$ is constructed, whose ouput alphabet (ie., its *signal constellation*) is taken from the set of vertices in a hexagonal tiling of the plane. It seems that this code is new.

Finally, we should mention that $\theta(m,d)$ is the "perfect shuffle" permutation obtained by separating a deck of n cards into d piles, consisting of the first m cards, the next m cards, ..., the last m cards, and then, taking the top card from the first pile, from the next pile, ..., from the last pile, m times.

2. Notation and usage.

We employ this notation:

$I_a$ is the set of the first a non-negative integers, and, $r_a: Z \to I_a$ is reduction mod a, for a positive integer a. We extend the use of this notation, so that: $I_a$ is identified with the set underlying the ring Z/aZ, in the usual manner, and, (whenever convenient), $I_b$ is identified with the corresponding subset in Z/aZ, if b<a; also, Z/aZ is permitted to be the target of $r_a$, and the domain of $r_a$ is allowed to be either a subset of Z, or else Z/bZ, for an integer b divisible by a.

We denote the greatest integer less than or equal to a real number x as $<x>$.

The usage established in the introduction for m, d, and n remains the same for the rest of this paper: m, d, and n are specified positive integers, with n=md.

$S_n$ is the group of permutations of $I_n$ or $Z/nZ$. For z in Z, we let [z] stand for the "add z" permutation in $S_n$; meaning, $[z](\alpha)=\alpha+z$, for $\alpha$ in $Z/nZ$.

3. Proof of Theorem 1.

For an integer b, let $\Phi(b,m,d)$ stand for the subgroup of $S_n$ generated by the permutations $[zb]\theta(m,d)[zb]^{-1}$, where z ranges over Z.

Proposition 1. Assume that e and h are integers such that: eh divides m; e divides d−1; and, $1=\gcd(e-1, d)$. Then $\Phi(hd,m,d)$ operates transitively on $I_n$.

Proof. Set $\delta=\theta(m,d)^{-1}[d]\theta(m,d)$. If $s \in I_d$, $t \in I_m$, and $k \in Z$, then $$\delta^k(sm+t)=sm+r_m(t+k).$$

So, for k in $I_m$ and x in $I_n$, $$[kd]^{-1}\delta^k(x)\equiv x+k(1-d)+jm \bmod n, \text{ where } j=0 \text{ if } r_m(x)<m-k, \text{ and } j=-1 \text{ if } r_m(x)\geq m-k. \quad (1)$$

Set $k=m/e$. Then $[kd]^{-1}\delta^k \in \Phi(hd,m,d)$. Put $v_1=(1-d)/e$ and $v_2=(1-d-e)/e$. By the hypotheses, $v_1$ and $v_2$ are integers, with $1=\gcd(v_1,d)=\gcd(v_2,d)$. Select integers $u_1$ and $u_2$ with $v_1u_1\equiv v_2u_2\equiv 1 \bmod d$. For each x in $I_n$, define v(x) and u(x) to be $v(x)=v_1$, $u(x)=u_1$, if $r_m(x)<m-k$, and $v(x)=v_2$, $u(x)=u_2$, if $r_m(x)\geq m-k$. Use of the congruence (1) shows that $[kd]^{-1}\delta^k(x)\equiv x+v(x)m \bmod n$. So $([kd]^{-1}\delta^k)^{u(x)}(x)\equiv x+m \bmod n$, for every x in $I_n$. Thus, it is enough to prove the following lemma.

Lemma. Let $\Phi$ be a subgroup of $S_n$ which contains $\theta(m,d)$. Then $\Phi$ operates transitively upon $I_n$, if, for each element x in $I_n$, there is an element $\mu\{x\}$ in $\Phi$ such that $\mu\{x\}(x)=r_n(x+m)$.

Proof. It is sufficient to show this: for any x in $I_n$, the greatest integer of x/d is $\sigma(x)$, for some $\sigma$ in $\Phi$. For each x in $I_n$, define $\alpha\{x\}=\theta(m,d)\mu\{\theta(m,d)^{-1}(x)\}\theta(m,d)^{-1}$. If $x=td+s$, where $t \in I_m$ and $s \in I_d$, then $\alpha\{x\}(x)=td+r_d(s+1)$. So $td=\beta(x)$, for some $\beta$ in $\Phi$. Since $t=\theta(m,d)^{-1}(td)$ is the greatest integer of x/d, the lemma is proved. q.e.d.

The permutation $\theta(m, d)$ has this characterization:

$$\text{if } x \in I_{n-1}, \text{ then } \theta(m,d)(x)=r_{n-1}(dx), \text{ and} \\ \theta(m,d)(n-1)=n-1. \quad (2)$$

Proposition 2. Let b and $b_o$ be integers with b dividing $b_o$. Let $m_o$ and $d_o$ be positive integers with $n=m_od_o$, and assume that $d_o\equiv d^a \bmod n-1$, for some integer a. Then $\Phi(b,m,d)$ operates transitively on $I_n$ if $\Phi(b_o,m_o,d_o)$ operates transitively on $I_n$.

Proof. From (2), it follows that $\theta(m_o,d_o)=\theta(m, d)^a$. So $\Phi(b,m,d)$ contains $\Phi(b_o,m_o,d_o)$. q.e.d.

EXAMPLE $\Phi(12,8,3)$ operates transitively on $I_{24}$ (use Prop. 1, with $e=2$). So $\Phi(12,6,4)$ operates transitively on $I_{24}$, since $3^3\equiv 4 \bmod 23$.

Let h be an integer. Since $\Phi(hd,m,d)$ is finite, each of its elements is a product of elements of the form $[khd]\theta(m,d)[khd]^{-1}$. So the strong component of a vertex v in $\Omega(h,m,d)$ is the orbit $\Phi(hd,m,d)(v)$. This completes the proof of Theorem 1.

4. More terminology.

From now on we assume that m, d and $n=md$ are fixed, and we write $\theta(m,d)$ simply as $\theta$. We denote the sets of arcs in the digraphs $\Omega(m,d)$ and $\Omega p(m,d)$ as A(m, d) and $A_p(m,d)$, respectively.

As a consequence of the formula (1) in the previous section, we see that the permutation $[zd]\theta^{-1}[zd]^{-1}\theta$ has no fixed points in $Z/nZ$, for $z=1, \ldots, m-1$.

We employ $Z/mZ$ as a set of "colors" for the arcs in $\Omega(m,d)$, this way: if $[kd]\theta[kd]^{-1}(w)=x$, then color $(w,x)=k$. The fact in the previous paragraph guarantees that the color of each arc in $\Omega(m,d)$ is unique. Evidently, distinct arcs in $\Omega(m,d)$ that are incident to or from the same the vertex are colored differently; ie., color: A(m, d)→Z/mZ establishes an edge coloring of $\Omega(m,d)$.

We let T(m,d) stand for the set of those (w,k,x) in $Z/nZ \times Z/mZ \times Z/nZ$ for which $[kd]\theta[kd]^{-1}(w)=x$; the elements of T(m, d) are the "colored arcs" in $\Omega(m,$ d).

The digraph we consider next is $\Omega_p(m,d)$, where p is a positive integer dividing m, with $1=\gcd(p,d)$. Along with p, we introduce the parameter $q=m/p$. The set of colored arcs in $\Omega_p(m,d)$ is $$T_p(m,d)=\{(w,k,x) \text{ in } T(m,d):kd\equiv w \bmod p\}.$$

For each vertex w, there are q elements in $T_p(m,d)$ having first coordinate$=w$. The middle coordinate in these ranges over the q elements k in $Z/mZ$ for which $kd\equiv w \bmod p$. For each vertex x, there are q elements in $T_p(m,d)$ having last coordinate$=x$. The middle coordinate in these ranges over the q elements in $Z/mZ$ with $k\equiv <x/d> \bmod p$.

It is clear that $\Omega(m, d)$, $\Omega(h,m,d)$, and $\Omega_p(m,d)$ are regular digraphs, whose degrees are m, $m/\gcd(h,m)$, and q, respectively.

We denote as G the (additive) subgroup $dZ/nZ$ in $Z/nZ$, and we define a G-action on
$Z/mZ$, by setting $(kd)(a)\equiv k+a \bmod m$;
$Z/nZ$, naturally;
A(m,d), $A_p(m,d)$, T(m,d), and $T_p(m,d)$, diagonally.
These G-actions are well-defined, and color: A(m,d)→Z/mZ is a G-set morphism.

5. The group $B_p(m,d)$.

Constructed next is a subgroup $B_p(m,d)$ of G-set morphisms in $S_n$, for which the strong component in $\Omega_p(m,d)$ of any vertex v is the orbit $B_p(m,d)(v)$.

Set $\mu=\gcd(q,d)$. A little checking shows that $\{sq+r_q(-<s/\mu>-y):s\in I_d\}$ is a full set of residues mod d, for any integer y.

For y in $I_q$, define the mapping $\beta_y:Z/nZ\rightarrow Z/nZ$ to be $B_y(x)=[c_y(x)d]\theta^{-1}[c_y(x)d]^{-1}(x)$, where $c_y(td+s)=-t+<s/\mu>p+yp$ for t in $I_m$ and s in $I_d$. For any vertex x, the colored arcs $(\beta_y(x),c_y(x),x)(y\in I_q)$ are the q elements in $T_p(m,d)$ having last coordinate$=x$. The mapping $\beta_y$ is given by the formula $$\beta_y(td+s)=psq+pr_q(-<s/\mu>-y)+p<s/\mu>d-\\+pyd+td,$$

where $t\in I_m$ and $s\in I_d$. Evidently, $\beta_y$ is a G-set morphism; from this, the fact in the previous paragraph, and the formula for $\beta_y$, it follows that $\beta_y\in S_n$.

Let $B_p(m,d)$ be the subgroup of $S_n$ generated by the permutations $\beta_y(y\in I_q)$. Obviously, the elements of $B_p(m, d)$ are G-set morphisms. The walks (respectively, backward walks) in $\Omega_p(m,d)$ come from strings of the permutations $\beta_y^{-1}$ (respectively, $\beta_y$). Thus, since $B_p(m,d)$ is finite, the vertices reachable from a given vertex by walks in $\Omega_p(m,d)$ are those reachable by backward walks in $\Omega_p(m,d)$. That is, the orbit $B_p(m,d)(v)$ is the strong component of the vertex v in $\Omega_p(m, d)$.

6. Proof of Theorem 2.

For u in $I_q$, we define the G-set morphism $\sigma(u):Z/nZ \to Z/nZ$ to be $\sigma(u)(x)=x+r_d(x)(m-1)+up(1-d)$. We denote as $\Sigma_p(m,d)$ the semigroup with identity generated by the morphisms $\sigma(u)(u \in I_q)$.

Lemma 1. The orbits of $B_p(m,d)$ and $\Sigma_p(m,d)$ are the same.

Proof. If $x_o \in I_d$, then the set of values $\{\beta_y(x_o):y \in I_q\}$ is $\{[upd]^{-1}\theta^{-1}[upd](x_o):u \in I_q\}$; and, $[upd]^{-1}\theta^{-1}[upd](x_o)=x_o+x_o(m-1)+up(1-d)$. For a G-set morphism $\mu$, the difference $\mu(x)-x$ is constant on each coset of G in Z/nZ. So, if $x \in x_o+G$, then the set of values $\{\beta_y(x):y \in I_q\}$ is $\{x+x_o(m-1)+up(d-1):u \in I_q\}$, which is the set of values $\{\sigma(u)(x):u \in I_q\}$. The rest is obvious. q.e.d.

The mappings in $B_p(m,d)$ and $\Sigma_p(m,d)$, being G-set morphisms, push down to mappings from Z/dZ to itself. Now we show that $B_p(m,d)$ and $\Sigma_p(m,d)$ operate transitively on Z/dZ. In light of the previous lemma, it is sufficient to prove this fact for $\Sigma_p(m,d)$.

Lemma 2. The semigroup $\Sigma_p(m,d)$ operates transitively on Z/dZ.

Proof. If $z \in Z/dZ$, then $\sigma(u)(z)=zm+up$. Set $d=ef$, where m is divisible by all the primes dividing f, and where $1=\gcd(e,m)$. If $m^{i+1} \equiv 1$ mod e, then $\sigma(1)\sigma(0)^i(z) \equiv z+p$ mod e. Since $1=\gcd(p,d)$, it follows that $\Sigma_p(m,d)$ operates transitively on Z/eZ.

Put $\mu=\gcd(m,d)$. Then $I_\mu$ is a full set of coset class representatives for the ideal generated by m in Z/dZ. Also, $I_q$ contains $I_\mu$, because $\mu$ divides q. Starting with some a in Z/dZ, select z in Z/dZ, and values $u_{j-1}, \ldots, u_0$ in $I_\mu$, so that $ap^* \equiv m^j z + m^{j-1} u_{j-1} + \ldots + u_0$ mod d, where $pp^* \equiv 1$ mod d, and where $m^j$ and f generate the same ideal in Z/dZ. Then $a \equiv \sigma(u_0) \ldots \sigma(u_{j-1})\sigma(0)(\bar{z})$ mod d, for any $\bar{z} \equiv zp$ mod e. For any $\bar{a}$ in Z/dZ, there is some morphism s in $\Sigma_p(m,d)$ for which $s(\bar{a}) \equiv zp$ mod e, since $\Sigma_p(m,d)$ operates transitively on Z/eZ. Thus, $\Sigma_p(m,d)$ operates transitively on Z/dZ. q.e.d.

So $B_p(m,d)$ operates transitively on Z/dZ. From this it follows that all the sets $\{b(x)-x:b \in B_p(m,d)$, and $b(x)-x \in G\}(x \in Z/nZ)$ are the same-equal to the intersection of G with the orbit $B_p(m,d)(0)$. This set, which we denote as M, is a subgroup of G. Since $B_p(m,d)$ operates transitively on Z/dZ, we find that the cardinality of each orbit of $B_p(m,d)$ in Z/nZ is d times the cardinality of M. Brief, familiar arguments prove the assertions in this paragraph. Supplying these is left to the reader.

In particular, we see that the group $B_p(m,d)$ operates transitively on Z/nZ iff M=G. According to Lemma 1, M is the set $\{s(x)-x:s \in \Sigma_p(m,d)$, and $s(x)-x \in G\}$, for any x in Z/nZ. So, $B_p(m,d)$ operates transitively on Z/nZ iff $s(x)-x$ generates the ideal G in Z/nZ, for some s in $S_p(m,d)$ and some x in Z/nZ. For instance, this happens if d divides $c=x_o(m-1)+pu_o(1-d)$, and $1=\gcd(m,c/d)$, for some $x_o$ in $I_d$ and some $u_o$ in $I_q$; then $c=\sigma(u_o)(x_o)-x_o$ generates G. This completes the proof of Theorem 2.

EXAMPLE

If m=6, d=4, then $B_3(6,4)$ operates transitively on Z/24Z—set $x_o=1$, $u_o=1$.

7. Trellis codes and digraph codes.

For lack of a better term, we refer to the following encoding apparatus as a "digraph code". The items involved are: a finite input alphabet I; a finite output alphabet H; a finite, regular digraph D, whose degree is the cardinality of I; the sets of vertices and arcs, V and A, respectively, in D; and, a mapping $\pi:A \to I \times H$. We put $\pi = \pi_{in} \times \pi_{out}$, and we let From(v,D) stand for the set of arcs in D that are incident from the vertex v. The essential feature of the mapping $\pi$ is that the restriction of $\pi_{in}$ to each set From(v,D) is bijective—therefore $\pi_{in}$ establishes, for each vertex v, a one to one correspondence between sequences in I and walks in D which begin at v. The encoding of a sequence i in I depends on the choice of an initial vertex v in V:i determines a walk from v in D; and, the encoding from v of i is $\pi_{out}$ applied to this walk.

A *trellis code* of the sort encountered in [3], [6], [7], or [8] is made from these components:
- a digraph code (I,H,D,$\pi$), as defined above.
- an input alphabet I×J, where J is a finite set.
- an output alphabet C which is a finite subset of a finite-dimensional Euclidean space.
- a. partitioning of C into equal-size, mutually disjoint subsets C(h)(h∈H), together with bijections c(h):J→C(h)(h∈H).

A sequence (i,j) in I×J is encoded this way: if h is a (digraph) encoding of i, then the corresponding (trellis) encoding of (i,j) is $\{c(h_t)(j_t)\}$, where $h=\{h_t\}$ and $j=\{j_t\}$. So, for each choice of an initial vertex v in V, there is an encoding from v of (i,j).

A trellis code's output alphabet is often referred to as its *signal constellation*. In keeping with this, we refer to the sets C(h) as "subconstellations". By attaching the label $\pi(\alpha)$ in I×H to the arc $\alpha$, for each arc $\alpha$ in D, we obtain the *trellis diagram* underlying the code.

Let $\mu$ be a metric on the set of outputs H in a digraph code (I, H, D, $\pi$). For equal-length sequences y and z in I, define $\mu(y,z)$ to be the minimum value of $\Sigma_t \mu(a_t,b_t)$, where $a=\{a_t\}$ and $b=\{b_t\}$ range over the various encodings of y and z, respectively. The free $\mu$ for (I,H,D,$\pi$), denoted here as $\mu_{free}(I,H,D,\pi)$, is the *smallest* value of $\mu(y,z)$ that occurs for *distinct infinite* sequences y and z in I.

For instance, suppose that (I,H,D,$\pi$) is the underlying digraph code for a trellis code with subconstellations C(h)(h∈H). Let N stand for the usual norm on Euclidean space (squared Euclidean distance from the origin), and define $\mu(h_1,h_2)$ to be the smallest value of $N(s_1-s_2)$ occuring for $s_1$ in $C(h_1)$ and $s_2$ in $C(h_2)$. Then the free squared Euclidean distance (FSED) for the trellis code is $\min\{\mu_{free}(I,H,D,\pi), \delta_{sc}\}$, where $\delta_{sc}=\min\{N(s_1-s_2):s_1,s_2 \in C(h)$ with $s_1 \neq s_2$, h∈H$\}$.

Denote as To(v,D) respectively, From (v,D) the set of arcs in the digraph D that are incident to (respectively, from) the vertex v.

The "blocking length" for a digraph code (I,H,D,$\pi$) is the smallest positive integer L with this property: $\alpha_t=\beta_t$, for $t=1, \ldots, L$, for any pair of walks $(\alpha_1, \ldots, \alpha_L)$, $(\beta_1, \ldots, \beta_L)$ in D with $\pi_{out}(\alpha_t)=\pi_{out}(\beta_t)$ for $t=1, \ldots, L$. Of course, a digraph code might not have a blocking length. Suppose that (I,H,D,$\pi$) has blocking length=L, and let $\mu$ be a metric on H. Then $\mu_{free}(I,H,D,\pi)$ can be computed by comparing (finite) walks in D which begin at the same vertex and end at the same vertex. The maximum length of the walks that must be considered can be bounded in terms of L and $\mu$. Furthermore, there is this obvious lower bound for $\mu_{free}(I,H,D,\pi)$: let $\delta_{from}$ (respectively, $\delta_{to}$) stand for the minimum value of $\mu(\alpha_1,\alpha_2)$ occuring for distinct arcs $\alpha_1$, $\alpha_2$ in From(v,D) (respectively, in To(v,D)), where v ranges over the vertices in D; then $\mu_{free}(I,H,D,\pi) \geq \delta_{from} + \delta_{to}$.

8. Two G-invariant digraph codes.

In this section we derive digraph codes based upon the digraphs $D = \Omega_p(m,d)$, $\Omega(m,d)$. These codes are G-invariant, in this sense: G acts on inputs I and outputs H; G acts on inputs I and outputs H; G acts compatibly on vertices V and arcs A in the digraph D; and, the mapping $\pi_{in} \times \pi_{out} = \pi: A \rightarrow I \times J$ is a G-set morphism.

The G-actions left unspecified below are those defined in Section 4.

EXAMPLE 1

The digraph in this code is $\Omega_p(m,d)$. As always, p is a positive integer dividing m, with $1 = \gcd(p,d)$. In addition, we now require that $1 = \gcd(p,q)$. The code is $D = \Omega_p(m,d)$, $I = Z/qZ$, where the G-action on I is $(kd)(i) \equiv k+i$ mod q, $H = Z/mZ$, $\pi_{out}$ = color, $\pi_{in}$ = the mod q reduction of color.

($\pi_{in}$ establishes a bijection From(v,D)→I, for each vertex v in $V = Z/nZ$, because $1 = \gcd(p,q)$.) The sets $\pi_{out}$(From(v,D)) and $\pi_{out}$(To(v,D)) for this code are the cosets of pZ/mZ in Z/mZ specified in Section 4.

EXAMPLE 2

The digraph in this code is $\Omega(m,d)$. The code employs this additional parameter: an integer $f > 1$ dividing m, with $d \equiv 1$ mod f. Below, $r: Z/nZ \rightarrow Z/fZ$ is reduction mod f, and the G-action on Z/fZ is $(kd)(z) \equiv kd + z$ mod f (ie., r is a G-set morphism). The code is $D = \Omega(m,d)$, $I = Z/mZ$, $H = Z/mZ \times Z/fZ$, $\pi_{out}$ = the mapping (w, x)→(color(w,x),r(w)), $\pi_{in}$ = color.

For this code, obviously $\pi_{out}$(From(v,D)) = Z/mZ × {r(v)}; and, as a consequence of the congruence $d \equiv 1$ mod f, we see that $\pi_{out}$(To(v,D)) = Z/mZ × {r($\theta^{-1}$(v))}.

Decoding is trivial in Examples 1 and 2-in either case, there is a mapping $\sigma: H \rightarrow I$ such that $\pi_{in} = \sigma \pi_{out}$. (A digraph code whose inputs and outputs are related this way is said to be *systematic.*)

For a digraph code (I,H,D,$\pi$), a probability distribution on I determines a Markov chain whose transition diagram is D, in the obvious way: the one-step transitions are the arcs in D, and the probability of a transition $\alpha$ is the probability of $\pi_{in}(\alpha)$. This Markov chain is irreducible iff D is strongly connected. A well-known theorem (see [1], Thm. 4.2.3) asserts that the Markov chain has a unique stable distribution if it is irreducible and aperiodic. Furthermore, if the distribution on I is uniform, then this stable distribution is uniform—meaning that, in the limit, each vertex in D occurs with equal likelihood, regardless of the value of the initial vertex. (The uniformity of the stable distribution is a consequence of the regularity of D.) If $D = \Omega_p(m,d)$ or $\Omega(m,d)$, then irreducibility guarantees aperiodicity, because (0,0) is an arc in D. For the codes constructed in Examples 1 and 2, it is clear that outputs occur with equal likelihood, whenever inputs and vertices occur with equal likelihood. So, for these codes, we obtain the following fact: if inputs are uniformly distributed, and if D is strongly connected, then, in the limit, outputs are uniformly distributed, regardless of the value of the initial vertex. This property simplifies maximum likelihood decoding.

Strongly connected digraphs $\Omega_p(m,d)$ and $\Omega(m,d)$ can be found by using Theorems 1 and 2. Finding conditions on p, m, and d which guarantee the existence of a blocking length for the codes in Examples 1 and 2 seems to be a rather more difficult problem.

9. A trellis code.

The ring $R = Z[e^{2\pi i/6}]$ is (up to a scale factor) the regular hexagonal lattice. For $u = e^{2\pi i/6}$, let X stand for the union of the 6 cosets $u^h + 3R$ (h = 0, ... 5). X is the set of vertices in a hexagonal tessellation of the plane.

Denote the rotation $z \rightarrow (u^b)z$ of the complex plane as $\sigma_b$, for b in Z. Obviously, the rotations $\sigma_b$ take X to itself.

Let (I, H, D, $\pi$) be the digraph code in Example 1, with $m = 6$ and $p = 3$. Then $I = Z/2Z$ and $H = Z/6Z$. Starting with a finite set J, construct subconstellations C(h)(h∈H), this way: select a bijection $c(0): J \rightarrow 1 + 3R$; and, for h in H, define $c(h): J \rightarrow u^h + 3R$ to be $\sigma_h c(0)$, and put $C(h) = c(h)(J)$.

Define an action of the group $G = dZ/6dZ$
on X, by setting $(kd)x = \sigma_k(x)$;
on J, trivially.

Since (I,H,D,$\pi$) is G-invariant, the trellis code described in the previous paragraph is *rotationally invariant*, in the sense defined by Wei in [7]: for any g in G, if s is the encoding of the input sequence (i,j) from the vertex v, then gs is the encoding of the input sequence (gi,gj) from the vertex gv—for all input sequences (i,j), and all vertices v. Rotational invariance provides transparency to the following impairment, known as *phase ambiguity:* the sequence s is transmitted; whereas what is received instead is gs. For more details, see [2], [5], [7], or [8].

REFERENCES

[1] U. N. Bhat, *Elements of Applied Stochastic Processes.* New York: Wiley, 1984.

[2] A. R. Calderbank and J. E. Mazo, "A new description of trellis codes, "*IEEE Trans. Inform. Theory,* vol. IT-30, pp. 784–791, 1984.

[3] A. R. Calderbank and N. J. A. Sloane, "new trellis codes based on lattices and cosets," *IEEE Trans. Inform. Theory,* vol. IT-33, pp. 177–195, 1987.

[4] G. Chartrand and L. Lesniak, *Graphs and Digraphs.* Monterey, CA: Wadsworth and Brooks/Cole, 1986.

[5] G. D. Forney, Jr., R. G. Gallagher, G. R. Lang, F. M. Longstaff, and S. U. Qureshi, "Efficient modulation for band-limited channels," *IEEE J. Select. Areas Commun.,* vol. SAC-2, pp. 632–647, 1984.

[6] G. Ungerboeck, "Channel coding with multilevel/phase signals," *IEEE Trans. Inform. Theory,* vol. IT-28, pp. 55–67, 1982.

[7] L. F. Wei, "Rotationally invariant convolutional channel coding with expanded signal space-II: Nonlinear codes," *IEEE J. Select. Areas Commun.,* vol SAC-2, pp 672–686, 1984.

[8] L. F. Wei, "Trellis-coded modulation with multidimensional constellations," *IEEE Trans. Inform. Theory,* vol. IT-33, pp. 483–501, 1987.

APPENDIX II

| | | |
|---|---|---|
| old state is: 0 | | |
| input is: 0 | output is: 0 | new state is: 0 |
| input is: 1 | output is: 3 | new state is: 14 |
| old state is: 1 | | |
| input is: 0 | output is: 4 | new state is: 5 |
| input is: 1 | output is: 1 | new state is: 19 |
| old state is: 2 | | |
| input is: 0 | output is: 2 | new state is: 11 |
| input is: 1 | output is: 5 | new state is: 21 |
| old state is: 3 | | |
| input is: 0 | output is: 0 | new state is: 12 |
| input is: 1 | output is: 3 | new state is: 2 |
| old state is: 4 | | |
| input is: 0 | output is: 4 | new state is: 18 |
| input is: 1 | output is: 1 | new state is: 4 |
| old state is: 5 | | |
| input is: 0 | output is: 2 | new state is: 23 |
| input is: 1 | output is: 5 | new state is: 9 |
| old state is: 6 | | |
| input is: 0 | output is: 0 | new state is: 1 |
| input is: 1 | output is: 3 | new state is: 15 |
| old state is: 7 | | |
| input is: 0 | output is: 4 | new state is: 6 |
| input is: 1 | output is: 1 | new state is: 16 |
| old state is: 8 | | |
| input is: 0 | output is: 2 | new state is: 8 |
| input is: 1 | output is: 5 | new state is: 22 |
| old state is: 9 | | |
| input is: 0 | output is: 0 | new state is: 13 |
| input is: 1 | output is: 3 | new state is: 3 |
| old state is: 10 | | |
| input is: 0 | output is: 4 | new state is: 19 |
| input is: 1 | output is: 1 | new state is: 5 |
| old state is: 11 | | |
| input is: 0 | output is: 2 | new state is: 20 |
| input is: 1 | output is: 5 | new state is: 10 |
| old state is: 12 | | |
| input is: 0 | output is: 0 | new state is: 2 |
| input is: 1 | output is: 3 | new state is: 12 |
| old state is: 13 | | |
| input is: 0 | output is: 4 | new state is: 7 |
| input is: 1 | output is: 1 | new state is: 17 |
| old state is: 14 | | |
| input is: 0 | output is: 2 | new state is: 9 |
| input is: 1 | output is: 5 | new state is: 23 |
| old state is: 15 | | |
| input is: 0 | output is: 0 | new state is: 14 |
| input is: 1 | output is: 3 | new state is: 0 |
| old state is: 16 | | |
| input is: 0 | output is: 4 | new state is: 16 |
| input is: 1 | output is: 1 | new state is: 6 |
| old state is: 17 | | |
| input is: 0 | output is: 2 | new state is: 21 |
| input is: 1 | output is: 5 | new state is: 11 |
| old state is: 18 | | |
| input is: 0 | output is: 0 | new state is: 3 |
| input is: 1 | output is: 3 | new state is: 13 |
| old state is: 19 | | |
| input is: 0 | output is: 4 | new state is: 4 |
| input is: 1 | output is: 1 | new state is: 18 |
| old state is: 20 | | |
| input is: 0 | output is: 2 | new state is: 10 |
| input is: 1 | output is: 5 | new state is: 20 |
| old state is: 21 | | |
| input is: 0 | output is: 0 | new state is: 15 |
| input is: 1 | output is: 3 | new state is: 1 |
| old state is: 22 | | |

APPENDIX II -continued

| | | |
|---|---|---|
| input is: 0 | output is: 4 | new state is: 17 |
| input is: 1 | output is: 1 | new state is: 7 |
| old state is: 23 | | |
| input is: 0 | output is: 2 | new state is: 22 |
| input is: 1 | output is: 5 | new state is: 8 |

APPENDIX III

| | | |
|---|---|---|
| old state is: 0 | | |
| input is: 0 | output is: 0 | new is: 0 |
| input is: 1 | output is: 3 | new state is: 28 |
| old state is: 1 | | |
| input is: 0 | output is: 2 | new state is: 45 |
| input is: 1 | output is: 5 | new state is: 17 |
| old state is: 2 | | |
| input is: 0 | output is: 4 | new state is: 35 |
| input is: 1 | output is: 1 | new state is: 15 |
| old state is: 3 | | |
| input is: 0 | output is: 0 | new state is: 24 |
| input is: 1 | output is: 3 | new state is: 4 |
| old state is: 4 | | |
| input is: 0 | output is: 2 | new state is: 22 |
| input is: 1 | output is: 5 | new state is: 42 |
| old state is: 5 | | |
| input is: 0 | output is: 4 | new state is: 11 |
| input is: 1 | output is: 1 | new state is: 39 |
| old state is: 6 | | |
| input is: 0 | output is: 0 | new state is: 1 |
| input is: 1 | output is: 3 | new state is: 29 |
| old state is: 7 | | |
| input is: 0 | output is: 2 | new state is: 46 |
| input is: 1 | output is: 5 | new state is: 18 |
| old state is: 8 | | |
| input is: 0 | output is: 4 | new state is: 36 |
| input is: 1 | output is: 1 | new state is: 8 |
| old state is: 9 | | |
| input is: 0 | output is: 0 | new state is: 25 |
| input is: 1 | output is: 3 | new state is: 5 |
| old state is: 10 | | |
| input is: 0 | output is: 2 | new state is: 23 |
| input is: 1 | output is: 5 | new state is: 43 |
| old state is: 11 | | |
| input is: 0 | output is: 4 | new state is: 12 |
| input is: 1 | output is: 1 | new state is: 32 |
| old state is: 12 | | |
| input is: 0 | output is: 0 | new state is: 2 |
| input is: 1 | output is: 3 | new state is: 30 |
| old state is: 13 | | |
| input is: 0 | output is: 2 | new state is: 47 |
| input is: 1 | output is: 5 | new state is: 19 |
| old state is: 14 | | |
| input is: 0 | output is: 4 | new state is: 37 |
| input is: 1 | output is: 1 | new state is: 9 |
| old state is: 15 | | |
| input is: 0 | output is: 0 | new state is: 26 |
| input is: 1 | output is: 3 | new state is: 6 |
| old state is: 16 | | |
| input is: 0 | output is: 2 | new state is: 16 |
| input is: 1 | output is: 5 | new state is: 44 |
| old state is: 17 | | |
| input is: 0 | output is: 4 | new state is: 13 |
| input is: 1 | output is: 1 | new state is: 33 |
| old state is: 18 | | |
| input is: 0 | output is: 0 | new state is: 3 |
| input is: 1 | output is: 3 | new state is: 31 |
| old state is: 19 | | |
| input is: 0 | output is: 2 | new state is: 40 |
| input is: 1 | output is: 5 | new state is: 20 |
| old state is: 20 | | |
| input is: 0 | output is: 4 | new state is: 38 |
| input is: 1 | output is: 1 | new state is: 10 |
| old state is: 21 | | |

APPENDIX III
-continued

| | | |
|---|---|---|
| input is: 0 | output is: 0 | new state is: 27 |
| input is: 1 | output is: 3 | new state is: 7 |
| old state is: 22 | | |
| input is: 0 | output is: 2 | new state is: 17 |
| input is: 1 | output is: 5 | new state is: 45 |
| old state is: 23 | | |
| input is: 0 | output is: 4 | new state is: 14 |
| input is: 1 | output is: 1 | new state is: 34 |
| old state is: 24 | | |
| input is: 0 | output is: 0 | new state is: 4 |
| input is: 1 | output is: 3 | new state is: 24 |
| old state is: 25 | | |
| input is: 0 | output is: 2 | new state is: 41 |
| input is: 1 | output is: 5 | new state is: 21 |
| old state is: 26 | | |
| input is: 0 | output is: 4 | new state is: 39 |
| input is: 1 | output is: 1 | new state is: 11 |
| old state is: 27 | | |
| input is: 0 | output is: 0 | new state is: 28 |
| input is: 1 | output is: 3 | new state is: 0 |
| old state is: 28 | | |
| input is: 0 | output is: 2 | new state is: 18 |
| input is: 1 | output is: 5 | new state is: 46 |
| old state is: 29 | | |
| input is: 0 | output is: 4 | new state is: 15 |
| input is: 1 | output is: 1 | new state is: 35 |
| old state is: 30 | | |
| input is: 0 | output is: 0 | new state is: 5 |
| input is: 1 | output is: 3 | new state is: 25 |
| old state is: 31 | | |
| input is: 0 | output is: 2 | new state is: 42 |
| input is: 1 | output is: 5 | new state is: 22 |
| old state is: 32 | | |
| input is: 0 | output is: 4 | new state is: 32 |
| input is: 1 | output is: 1 | new state is: 12 |
| old state is: 33 | | |
| input is: 0 | output is: 0 | new state is: 29 |
| input is: 1 | output is: 3 | new state is: 1 |
| old state is: 34 | | |
| input is: 0 | output is: 2 | new state is: 19 |
| input is: 1 | output is: 5 | new state is: 47 |
| old state is: 35 | | |
| input is: 0 | output is: 4 | new state is: 8 |
| input is: 1 | output is: 1 | new state is: 36 |
| old state is: 36 | | |
| input is: 0 | output is: 0 | new state is: 6 |
| input is: 1 | output is: 3 | new state is: 26 |
| old state is: 37 | | |
| input is: 0 | output is: 2 | new state is: 43 |
| input is: 1 | output is: 5 | new state is: 23 |
| old state is: 38 | | |
| input is: 0 | output is: 4 | new state is: 33 |
| input is: 1 | output is: 1 | new state is: 13 |
| old state is: 39 | | |
| input is: 0 | output is: 0 | new state is: 30 |
| input is: 1 | output is: 3 | new state is: 2 |
| old state is: 40 | | |
| input is: 0 | output is: 2 | new state is: 20 |
| input is: 1 | output is: 5 | new state is: 40 |
| old state is: 41 | | |
| input is: 0 | output is: 4 | new state is: 9 |
| input is: 1 | output is: 1 | new state is: 37 |
| old state is: 42 | | |
| input is: 0 | output is: 0 | new state is: 7 |
| input is: 1 | output is: 3 | new state is: 27 |
| old state is: 43 | | |
| input is: 0 | output is: 2 | new state is: 44 |
| input is: 1 | output is: 5 | new state is: 16 |
| old state is: 44 | | |
| input is: 0 | output is: 4 | new state is: 34 |
| input is: 1 | output is: 1 | new state is: 14 |
| old state is: 45 | | |
| input is: 0 | output is: 0 | new state is: 31 |
| input is: 1 | output is: 3 | new state is: 3 |
| old state is: 46 | | |
| input is: 0 | output is: 2 | new state is: 21 |
| input is: 1 | output is: 5 | new state is: 41 |
| old state is: 47 | | |
| input is: 0 | output is: 4 | new state is: 10 |
| input is: 1 | output is: 1 | new state is: 38 |

I claim:

1. An encoder for coding data intended for transmission over a channel, comprising:
   state means for receiving inputs i of said data, where i=0, ..., q−1, and where q is an integer greater than one, and for generating outputs j, where j=0, ..., m−1 and m=pq where p is an integer greater than one and has no common factors with q, said outputs generated according to said inputs i and states s of said state means according to j=i mod q and jd=s mod p, where s=0, ..., n−1 and n=md where d is an integer greater than one and has no common factors with p; and
   state update means for updating said state means to a new state t chosen from said 0, ..., n−1 based on said ouput j and previous state s according to t=jd+F(s−jd) mod n, where F is the permutation of 0, ..., n−1 and is a function given by F(am+b)=bd+a for a=0, ..., d−1, and for b=0, ..., m−1.

2. An encoder according to claim 1, wherein:
   said state means is arranged to accept two inputs i, to generate six outputs j, and to assume at least twelve states s.

3. An encoder according to claim 2, wherein:
   said state means is arranged to assume twenty-four states s.

4. An encoder according to claim 2, wherein:
   said state means is arranged to assume forty-eight states s.

\* \* \* \* \*